Figure 1:
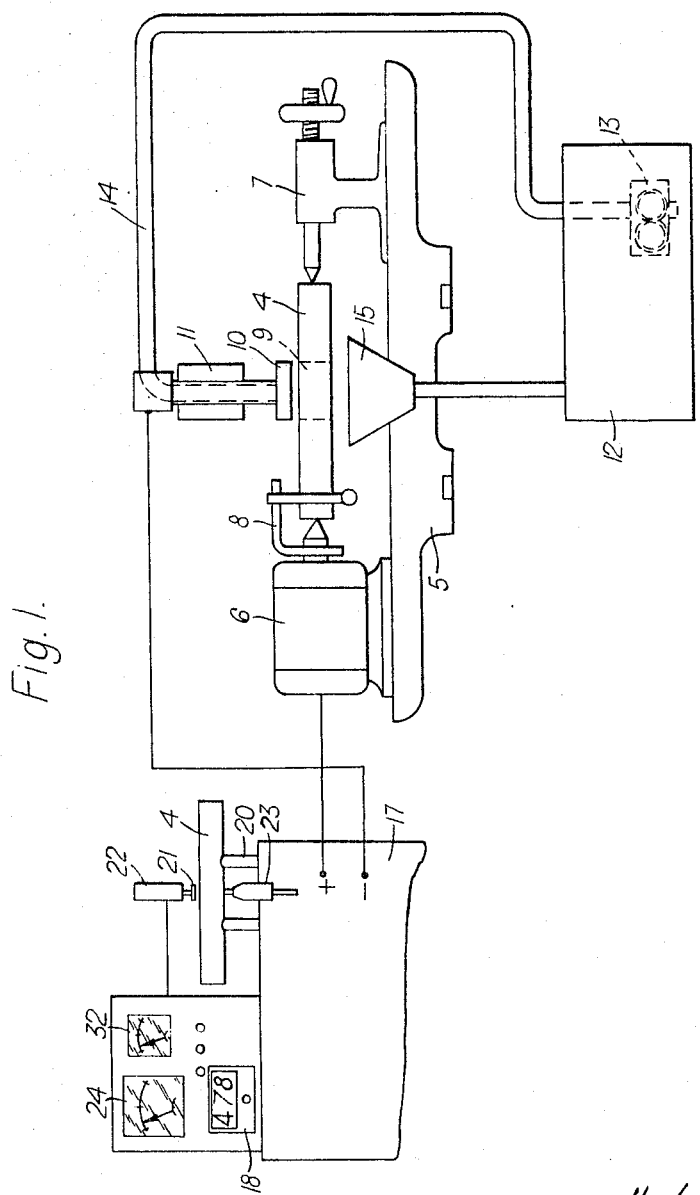

Jan. 31, 1967   H. D. HUGHES   3,301,776
APPARATUS FOR ELECTROCHEMICAL MACHINING OF METAL
Filed April 7, 1964   2 Sheets-Sheet 1

Inventor
Herbert D. Hughes
By
Watson, Cole, Grindle & Watson
Attorneys

United States Patent Office 3,301,776
Patented Jan. 31, 1967

3,301,776
APPARATUS FOR ELECTROCHEMICAL
MACHINING OF METAL
Herbert D. Hughes, Banstead, Surrey, England, assignor to Metachemical Machines Limited
Filed Apr. 7, 1964, Ser. No. 357,910
Claims priority, application Great Britain, Apr. 8, 1963, 13,840/63
2 Claims. (Cl. 204—224)

The present invention relates to methods and apparatus for the machining of workpieces, in particular by procedures where the machining is performed by the action of an electric current, for example the electrochemical machining of metals where a workpiece is rotated relatively to an electrode and an electrolyte is caused to circulate between the electrode and the workpiece at such a rate that metal removed from the surface of the workpiece is not deposited upon the cathode but is carried away in the circulating electrolyte.

With such electrical machining operations the amount of metal removed bears a simple relation to the quantity of electricity caused to pass between the electrodes represented by the cathode on the one hand and the workpiece on the other hand.

In general in the machining of similar workpieces the problem is to reduce each workpiece to an accurately predetermined size although the initial workpieces may vary within production limits. For example in the machining of circular rod-like workpieces the amount of metal to be removed will vary for each of them and will include a constant factor related to the width of the area to be machined and the diameter thereof, while there will be a variable factor dependent on the degree to which the area to be machined is initially oversize. In the electrochemical machining of workpieces there will be an additional constant factor related to the electrochemical constant of the material being handled. Thus in reducing a series of nominally identical workpieces by machining processes to produce a portion of said workpiece of accurately predetermined size, the amount of current required to effect machining will depend on a number of constant factors, namely the workpiece material being handled, the length of the area being machined and the diameter of the part of the workpiece being machined, and there will be a variable factor determined by the starting dimension of the workpiece.

The object of the present invention is to provide for the precision machining of workpieces to accurately predetermined sizes, and the present invention comprises assessing the amount of material to be removed to reduce the workpiece to the required size and controlling the machining so as to remove the said amount of material.

Where machining is performed by electrical or electrochemical action the present invention further comprises gauging each of a series of workpieces of the same nominal size to determine the actual initial dimensions and controlling the quantity of current in accordance with the gauging result to effect machining of the workpiece to the requirmed dimensions.

The control of machining may be performed by combining a presettable factor variable according to the dimensions of the sections of the workpieces to be machined and to the workpiece material, with a variable factor obtained from gauging an actual specific dimension of each workpiece and utilising the combined result to terminate machining when the workpiece has been machined to a desired value of said specific dimensions.

The presettable factor may be a numerical value calculated from the length and nominal diameter of the sections of said workpieces to be machined and from the workpiece material, and the variable factor is the measured diameter of said section of each workpiece and wherein the time integral of the current value is measured and compared with the combined value of the presettable factor and the variable factor is arranged to terminate machining when the required diameter is attained.

Apparatus according to the present invention may comprise a machining unit including means to support and to rotate a workpiece, an electrode adapted to be brought into close proximity to the workpiece and means to supply an electrolyte into the zone between the electrode and the section of the workpiece to be machined, and a control unit comprising power supply equipment and switch means to regulate the flow of electric current between the electrode and the workpiece while machining is in progress, said control unit including means adapted to be preset according to the nominal dimensions of the sections of the workpieces to be machined and a gauging means to assess the actual starting dimensions of each successive workpiece and thereby to control the operation of the switching means during the machining of each successive workpiece.

Figure 2:
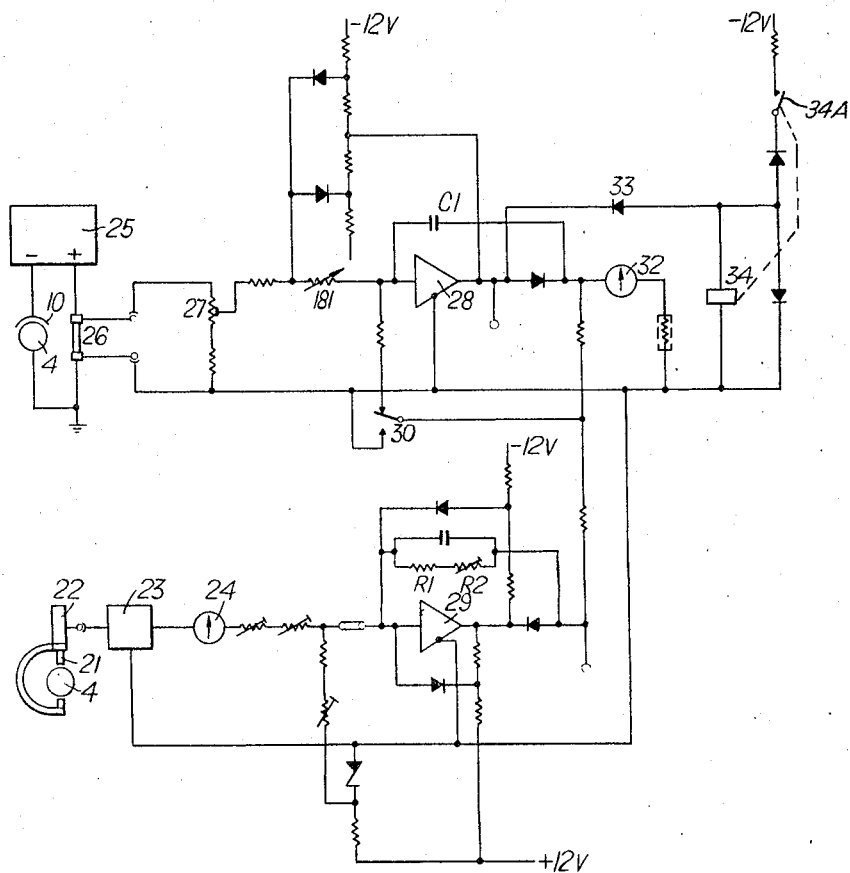

The features of the present invention are illustrated in diagrammatic form on the accompanying drawings in which:

FIG. 1 is a diagrammatic view showing the equipment according to the present invention, and FIG. 2 is a circuit diagram showing the control circuit for regulating the machining operation.

As shown on FIG. 1 of the drawings, a rod-like workpiece 4 is mounted for rotation on a suitable carrier represented in the form of a simple lathe having a bed 5, a head stock 6 and a tail stock 7. The head stock 6 embodies suitable drive mechanism to drive the workpiece 4 from the live centre by means of a driving bar 8. The area of the workpiece 4 to be machined is indicated by the zone 9 shown in dotted lines. An electrode 10 is slidably mounted in a suitable guide 11 and is brought to a position comparatively close to the surface of the workpiece 4 to be machined, but it is not in contact with said workpiece. A flow of a suitable electrolyte from a storage tank 12 is delivered by a pump 13 to a feed pipe 14 which feeds the electrolyte to the zone between the electrode 10 and the workpiece 4. The stem-like support for the electrode 10 may be hollow and the electrolyte may be delivered through said stem. A suitable funnel or like collecting device 15 beneath the workpiece 4 collects surplus electrolyte and returns it to the tank 12. The lathe assembly 5, 6, 7 and thus the workpiece 4 is connected electrically to a power unit 17 including a low voltage high current source, the negative terminal being connected through a control switch to the electrode 10. It will be understood that during the machining operation the workpiece 4 is rotated, current is supplied from the source through the switch to the electrode 10 and electrolyte is circulated through the gap between the electrode and the workpiece. With an appropriate circulation of electrolyte through the gap, ions removed from the surface of the workpiece are carried away with the electrolyte and under these conditions the rate of removal of the metal is directly dependent on the current flow and hence if the amount of metal to be removed is known, a simple computation will show the quantity of current (ampere/seconds, i.e. coulombs) required to reduce the workpiece to the required size.

As already indicated, the amount of metal to be removed from any given workpiece comprises a constant factor and a variable factor. The constant factor is derived from the axial length to be machined and the nominal diameter, as well as the electrochemical constant of the workpiece material. The variable factor is represented by the actual outside diameter of each particular workpiece which may vary slightly from component to component. From the known constant factors a simple arithmetical operation is effected based on a constant for the particular material multiplied by the axial length and then multiplied by the nominal diameter of the workpiece. This gives a numerical figure which is preset on a multiple dial-setting device 18, indicated generally at 18 which serves for adjusting the position of a wiper element of a potentiometer 27, referred to in connection with FIG. 2 below. The variable factor is determined by the examination of each particular workpiece to be machined on a gauging device which in the embodiment shown diagrammatically in FIG. 1 may comprise a V-shaped holder 20 to receive the workpiece 4 before machining and a feeler member 21 adapted to press upon the workpiece and to be deflected according to the outside diameter of the workpiece.

The feeler member 21 forms part of a transducer device 22 adapted to produce an electrical signal representative of the outer diameter of the workpiece 4 and provides a variable factor which is combined with the presettable factor represented on the dial-setting device 18 to control the period for which the current is applied between the electrode 10 and the workpiece 4 on the equipment shown diagrammatically in FIG. 1, it being understood that after the workpiece has been gauged in the holder 20 said workpiece is transferred to the electrochemical machining position.

The transducer 21, 22 operates in conjunction with a micrometer device 23 which controls the positioning of the workpiece 4 relatively to the feeler 21, the holders 20 serving mainly to prevent excessive free movement of the workpiece during gauging.

Control of the machining operation in accordance with the presettable constant factor adjusted on the device 18 and the variable factor determined by the transducer 21, 22 is effected through an analogue computer system, a typical arrangement being shown for example on FIG. 2 of the drawings.

The workpiece 4 and the electrode 10 are shown together with a power supply unit 25 including a main control switch or contactor. A shunt 26 is included in the machining circuit to produce a control voltage dependent on the current flow in amperes in the machining circuit. The voltage from the shunt 26 is applied to a presettable adjusting resistor 27 and then through a long scale variable resistor 181 forming part of the preset control 18, shown on FIG. 1. The variable output obtained from the shunt through the variable resistor 181 is applied to an "operational" amplifier 28. The term "operational amplifier" refers to the type of high gain D.C. amplifier commonly used in analogue computing equipment for performing a range of mathematical operations, and commonly employed under conditions providing a very large measure of feed back thus securing high stability in use.

The operational amplifier 28 is shunted by means of an integrating capacitor $C_1$ the voltage of which is preset by the gauging operation, as will now be explained. The transducer 21, 22 is coupled to a transducer amplifier 23 the output of which is fed to an indicating meter 24 (shown also on FIG. 1 of the drawings) which gives an immediate reading of the actual outside dimension of each workpiece 4 being gauged. This output is then fed to a second operational amplifier 29 shunted by a fixed resistor $R_1$ and a presettable resistor $R_2$ which regulates the sensitivity of the amplifier and thus serves as a calibration control.

When the workpiece 4 is inserted into the gauging position at the transducer 21, 22 a switch, not shown, is operated, the contacts of such switch being indicated at 30 in the position which they occupy when gauging is in progress. The moving element of this switch is connected to the output of the operational amplifier 29 which responds to the displacement of the feeler 21, the fixed contact engaged by the moving contact 30 transmitting the output of the operational amplifier 29 to the input of the amplifier 28 with the result that the capacitor $C_1$ is charged by the operational amplifier 28 to a value which is dependent on the diameter of the workpiece 4 as gauged by the transducer 21, 22. No current is flowing in the machining circuit from the power source 25 and thus when the workpiece 4 is removed from the gauging position the voltage preset on the capacitor $C_1$ is maintained since the switch contact 30 moves away to its alternative position leaving the input to the operational amplifier 28 isolated since no current is flowing through the shunt 26 at this time, machining having not yet commenced.

The timing circuit not shown on the drawings provides a predetermined period sufficient to enable the workpiece 4 to be inserted into the machining position in the lathe device 5, 6, 7, but if no action is taken within a predetermined period the circuit shown on FIG. 2 is restored to the zero position ready for a further gauging operation.

However, in regular operation a workpiece 4 which has been gauged is placed in the working position and machining is commenced by the operation of a start button which causes current to flow from the power source 25 through the shunt 26 and between the workpiece 4 and the electrode 10, resulting in removal of metal by electrochemical action.

The voltage developed across the shunt 26 is directly dependent on the current flow in amperes and is transmitted to the input of the operational amplifier 28 and provides a signal which progressively reduces the charge on the capacitor $C_1$. The initial voltage on the capacitor $C_1$ is also indicated on a meter 32, shown also on FIG. 1 of the drawings, being calibrated, just like the meter 24, in dimensional units so that initially the meters 24 and 32 give the same reading. As machining progresses however the reading on the meter 32 gradually falls towards zero as machining progresses.

The output from the operational amplifier 28 is also applied to a diode 33 connected to a sensitive relay such as a reed relay 34. The diode 33 is so connected that when the voltage at the output of the operational amplifier 28 reaches zero there is a path to the relay 34 which thus operates as soon as the voltage across the capacitor $C_1$ has fallen to zero. The relay 34, operating through an intermediate relay, not shown, closes a contact 34A which provides a holding circuit for the relay 34 and the intermediate relay is adapted to release a contactor in the power supply unit 25 to terminate the flow of machining current.

Various auxiliary features are shown on the circuit diagram such as overload protection devices, but as these devices are common practice in the analogue computer art, it has not been thought necessary to refer to these components in detail, the foregoing description being directed to the essential functional characteristics of the equipment.

What I claim is:

1. Apparatus for the electrochemical machining of workpieces, comprising in combination means to support a workpiece during machining operations, a low voltage high current supply circuit to cause current to flow between an electrode and the workpiece, means circulating electrolyte between said electrode and said workpiece at such a rate that metal removed from the surface of the workpiece is carried away in the circulating electrolyte, and gauging means including a timing circuit for automatically establishing the extent of machining which is calculable from the initial dimensions of each successive workpiece and including means to preset said timing circuit according to said dimensions and the composition of the material of the workpiece, means responsive to the quantity of said current flow between the electrode and the workpiece to effect the timing of the machining operation in said timing circuit at a rate dependent on said current flow and additionally responsive to said variable presettable means dependent on the calculated workpiece dimensions and the composition of material, and means to terminate the current flow when the machining has been maintained the corresponding time thereby serving to reduce the workpiece to the required size.

2. Apparatus according to claim 1, including an operational amplifier with a feed back capacitor, means charging said capacitor to a magnitude determined by said calculable extent of machining and wherein the input to said amplifier receives a voltage dependent on the current flow and said presettable means so as to effect discharge of said capacitor towards a predetermined value, and means sensing the attainment of said value comprising a relay adapted to terminate the flow of machining current when said capacitor reaches said predetermined value whereby the workpiece has been reduced to predetermined required dimensions.

References Cited by the Examiner
UNITED STATES PATENTS

| | | | |
|---|---|---|---|
| 2,832,734 | 4/1958 | Eckfeldt | 204—195 |
| 3,063,929 | 11/1962 | Phelan | 204—228 |
| 3,251,762 | 5/1966 | Gordon | 204—143 |

JOHN H. MACK, *Primary Examiner.*

R. K. MIHALEK, *Assistant Examiner.*